April 21, 1936.   K. L. TATE   2,037,949
FORCE MEASURING DEVICE
Filed Oct. 1, 1932
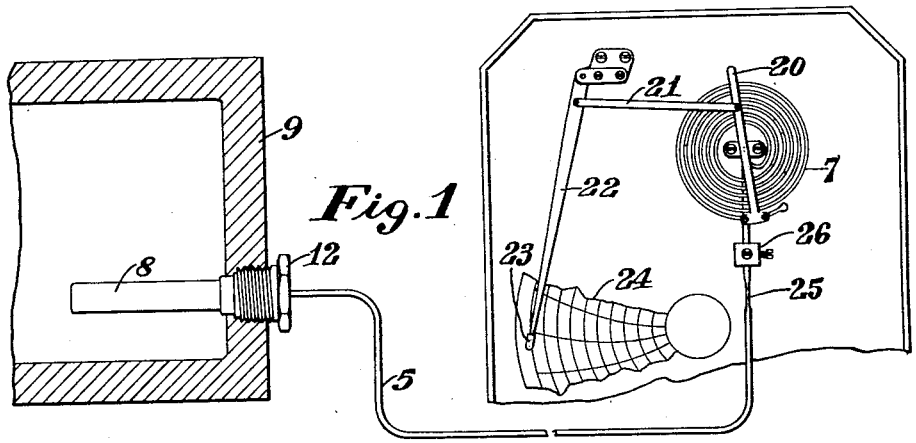
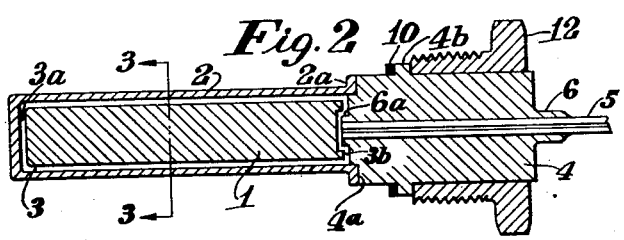
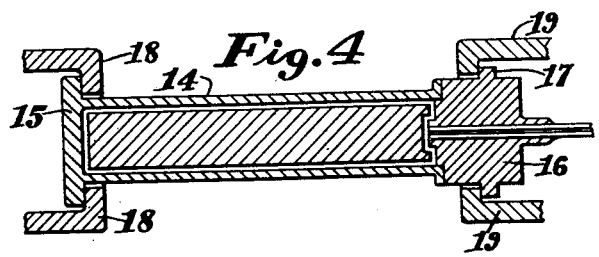
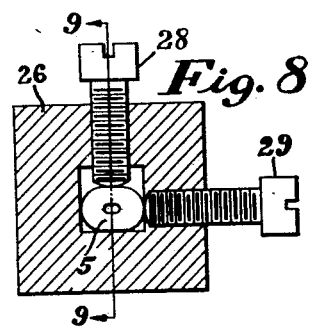
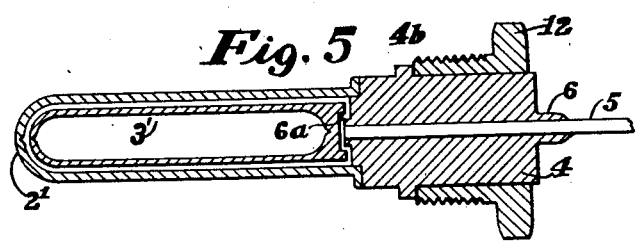
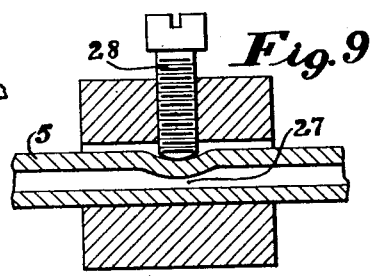
INVENTOR.
Kenneth L. Tate
BY D. Clyde Jones
ATTORNEYS.

Patented Apr. 21, 1936

2,037,949

UNITED STATES PATENT OFFICE 2,037,949

FORCE-MEASURING DEVICE

Kenneth L. Tate, Rochester, N. Y., assignor to Taylor Instrument Companies, Rochester, N. Y., a corporation of New York Application October 1, 1932, Serial No. 635,822

4 Claims. (Cl. 73—31)

This invention relates to apparatus for the measurement of pressures and more in particular for the measurement of fluid pressure. This application is a continuation in part of application Serial No. 523,503, filed March 18, 1931.

Heretofore, the usual method of measuring fluid pressures involved the use of a Bourdon spring element connected to the pressure medium by a pressure-transmitting tubing. In the instance of the measurement of pressure within a viscous or plastic medium, it is difficult, if not impossible, to secure satisfactory transmission of pressure to the pressure-responsive element, that is, the Bourdon spring or the like. Likewise, there are cases where it is undesirable to allow the material under pressure to serve as the pressure-transmitting medium. As an example of the latter, it is highly objectionable to use a Bourdon gauge in connection with the treatment of milk or the like, since the entrance of milk into the transmitting tubing would give rise to the very conditions generally condemned by sanitation engineers and authorities. In many instances, corrosive liquids cannot be measured for pressure because of the difficulty of transmitting the pressure to the pressure-responsive element.

It is the object of the invention to provide an instrument of the character referred to, which is not subject to the various disadvantages mentioned.

For a full understanding of the invention, its characteristic features and its principle of operation, reference is made to the accompanying drawing wherein Fig. 1 is a diagrammatic representation on a reduced scale, of the invention showing its application;

Fig. 2 is a cross-section of a construction constituting one embodiment thereof;

Fig. 3 is a section on line 3—3 of Fig. 2;

Fig. 4 is a sectional view of a slightly modified form of the invention and a different application thereof;

Fig. 5 is a sectional view of an additional modified form of bulb;

Fig. 6 is a cross-sectional view of the compensated capillary tube employed in the system of Fig. 1;

Fig. 7 is an enlarged cross-sectional view of a section of the capillary tube illustrating how it is compressed to introduce an initial pressure in the tube system; and Fig. 8 is a cross-sectional view taken at right angles to the capillary tube, and Fig. 9 is a cross-sectional view on line 9—9 of Fig. 8, of an arrangement for providing an adjustable constriction in the capillary tube.

The invention in its general form and make-up is a bulb similar to the usual mercury bulb used as a heat-sensitive actuating element of a temperature measuring, recording or controlling apparatus.

However, in contradistinction to the usual temperature sensitive bulb it comprises a large central core of a ferrous composition having a small coefficient of expansion, preferably a nickel-iron alloy commonly referred to in the trade as "invar".

The core 1 is surrounded by a steel shell 2 of high grade steel of good elastic properties. The core 1 and the shell 2 are so formed relatively to one another as to define a narrow annular interspace 3. While the object of the invention may be carried out in various ways, in one embodiment the core is formed separately and is surrounded by an interspace comparable in cross-section to a capillary conduit, including an interspace 3a at the bottom and an interspace 3b at the top.

The bulb includes a head 4 of larger diameter than the shell and defining with the latter a shoulder 4a, and the shell, at its inner end, is provided with a flange 2a which is first machined to fit the shoulder and is then welded to it to make the head integral with the head 4.

Before the shell is welded on to the head 4, a bore is drilled lengthwise through the latter to the inner surface thereof to receive a capillary tube 5, which latter is then welded to the head at the inner and outer surfaces. The latter is preferably formed with bosses 6 and 6a for securing a good welding seal. The capillary tube is preferably compensated by a wire core 5a of nickel-iron alloy of low coefficient of expansion such as invar.

The capillary tube 5 is connected to the usual form of device sensitive to fluid pressure, preferably of the Bourdon spring type such as is indicated at 7. This spring through a system of linkage including arms 20 and 21 may actuate an indicating, recording or regulating member. For purposes of illustration, this linkage is herein shown as actuating a pivoted pen arm 22 which moves its pen 23 over a chart 24 having suitable coordinates of pressure and time. This chart is actuated in accordance with time by well-known clock mechanism (not shown).

The interior of the Bourdon spring 7, the capillary 5 and the interspace 3 in the bulb are then filled in the usual way with mercury or a similar pressure transmitting liquid and the tube system is then sealed. Thereafter the capillary is compressed or "pinched", as indicated at 25, (Figs. 1 and 7) to develop a predetermined internal pressure within the tube system, and the instrument is then calibrated in the usual manner. Since in an installation such as that indicated in Fig. 1, the bulb 8 is frequently subjected to slight fluctuating pressures which cannot be conveniently read, the capillary tube 5 may be inserted through a hollow block 26 provided with set screws 28 and 29 for adjustably regulating a constriction 27 in the capillary tube bore (see Figs. 8 and 9). It will be understood that by unscrewing screw 29 and by tightening screw 28, the capillary tube 5 may be deformed to increase constriction 27, while a reverse adjustment of screws 28 and 29 tends to restore tube 5 to its original shape and thereby reduce constriction 27. By means of this adjustable constriction, violent surges of pressure and rapid pulsations of pressure applied to the bulb 8 are damped out, while the instrument still has as quick response to pressure changes as can be conveniently read or recorded. This method of damping pulsations by constricting the bore of the capillary tube can be used without fear of the bore being clogged, since the system is closed and no foreign matter can enter into the transmitting liquid.

The device thus constituted may be applied for various purposes. As indicated in Fig. 1, the bulb 8 may be introduced into a pressure vessel 9. For such application the head 4 is preferably provided with a collar 4b to seat with interposition of a gasket 10 against the bottom wall of a bore in the wall of a vessel, and a bushing nut 12 may be used in cooperation with the threaded wall of the bore to bear upon the collar 4b and thus make a seal withstanding high pressure.

When the bulb is subjected to the fluid pressure in the vessel 9, the walls of the bulb are correspondingly compressed causing a corresponding displacement of the mercury out of the bulb through the capillary into the Bourdon spring 7 which actuates the pen arm 22 through links 20 and 21.

Fig. 4 shows the application of the invention as an adjunct to mechanism for the measurement of tensile strength of a material. To this end the shell 14 carries at its bottom end a flange 15, another flange 17 being provided on the head 16 for cooperation with grapple plates 18 and 19, to place the bulb under the load to be measured.

The modified form of the invention shown in Fig. 5 is quite similar to that shown in Fig. 2, except that the shell 2 is formed from a tube by having its end 2' swaged and sealed closed by welding. Also the core 3' is hollow being formed from an invar tube having its ends swaged and sealed closed by welding. The use of the hollow core 3' reduces the heat capacity of the system and thereby reduces the time required for establishing temperature equilibrium, thereby minimizing the effect of temperature disturbance on the record made by the pen 23.

The invention is normally intended for the measurement of large pressures, of the order of 0 to 5,000 lbs. or more per square inch, but an instrument embodying the invention is accurately responsive to all pressures between an initial pressure, say atmospheric pressure and the limit for which it is designed and calibrated.

An important feature in the invention described, is the possibility of attaining complete temperature compensation. The diameter of the core of material having a low coefficient of expansion may be so chosen relatively to the volume of mercury in the bulb, the internal diameter of the shell and the coefficient of expansion of the shell material as to afford substantially perfect compensation for all usual temperature changes met with in practice, with the result that no appreciable temperature error can enter into the indication of the gauge.

There are numerous points to be considered in the design of a construction embodying the invention. Different pressure ranges call for different dimensions of parts. The dimensions must be such that the volume deformation of the shell for the total pressure range will be only a small fraction of the initial volume of the mercury layer. Thus, for instance, in an instrument for the measurement of pressure from 0 to 40,000 lbs. in a rubber extruder, the deformation of the shell at maximum pressure is approximately $\frac{1}{12}$ of the initial volume of the mercury film. By maintaining a definite ratio, temperature compensation becomes substantially independent of the pressure.

In the designing of the device both the bulb and the Bourdon spring or other pressure responsive device should possess an appreciable stiffness, that is, they should offer substantial resistance to deformation by pressure applied thereto. It has been found in practice that if the bulb, the invar core and the Bourdon spring, each has appreciable stiffness, with the stiffness and the elastic hysteresis of the bulb and spring members properly related to the stiffness and elastic hysteresis of the core, the effect of elastic hysteresis in the device can be substantially eliminated. It is believed that this result is obtained because the elastic hysteresis of these members is cancelled or neutralized by the elastic hysteresis of the core. (The term "elastic" hysteresis as here used, refers to a characteristic of the stress-strain cycle of an imperfectly elastic member. The hysteresis at any point in an elastic cycle is the difference in values of strain, linear or volumetric, caused by the stress first rising and then falling through the specified value of stress.) A practical stiffness of the Bourdon spring is 1000 lbs., that is 1000 lbs. per square inch must be applied to the interior of the spring in order to move the indicating member or pen arm 22 through its full deflection over the scale of chart 24. The stiffness of the shell 2 of the bulb is, of course, determined by the pressure to be measured. By way of example, the device shown in Fig. 5 has a range of 10,000 lbs. so that the bulb is made to have a stiffness of 9,000 lbs. per square inch and the Bourdon spring 7 a stiffness of 1000 lbs. per square inch. Since a Bourdon spring functions best when the initial pressure to which it responds, is a substantial amount, the system including the spring preferably has an initial internal pressure of approximately 400 lbs. per square inch, established by deforming the capillary bore adjacent the Bourdon springs, indicated at 25. Under the conditions assumed in this example, when there is no external pressure applied on the bulb the internal pressure is 400 lbs. per square inch, but with the maximum pressure of 10,000 lbs. per square inch applied to the bulb, the internal pressure in the system increases from 400 lbs. per square inch to 1400 lbs. per square inch.

In computing the dimensions of the bulb to give a definite working range, account is made of the increase in volume of the spring and the pressure required to produce expansion and proper rotary motion. It is obvious that the dimensions of the bulb may be varied in three ways to produce the same effect. With a fixed length of bulb the outside diameter may be increased with a corresponding increase in wall thickness. With a change in length, either the outside diameter or wall thickness may be altered. An empirical equation based upon a general solution of the deformation of a tube under external and internal pressure expresses the performance of any practical system fairly accurately. The equation assumes the use of a 1000 lb. Bourdon spring of definite volume increase characteristics:

$$P = \frac{16,600(R^2 - r^2)}{r^2 R^2 L} + 24,000(R - r) + 1,000.$$

P = Working range of system in lbs. per square inch.
R = External radius of shell in inches.
r = Internal radius of shell in inches.
L = Length of shell in inches (straight part only).
1000 = Stiffness of spring in pounds per square inch.

It is only necessary to consider the limiting dimensions of the application on the bulb size, together with manufacturing tolerances, uniformity of the material, strengths, costs, etc. to decide upon the proper dimensions for any working range.

The relation between the volume of the compensator or core 1 and the volume of shell 2 for complete compensation is determined as follows:

$$V \text{ compensator} = \frac{\beta HG - \beta \text{ shell}}{\beta HG - \beta \text{ compensator}} \times V \text{ shell}.$$

When the coefficients of cubical expansion of the shell, compensator and mercury are:
$\beta$ shell = .000018 per °F.
$\beta$ compensator = .000005 per °F.
$\beta$ mercury = .000102 per °F.

then,
$$V \text{ compensator} = .87 \times V \text{ shell}.$$

I claim:

1. In an instrument of the class described, a pressure responsive device, mechanism actuated thereby, a slightly yieldable shell, a capillary tube connecting the interior of said shell to the interior of said pressure responsive device, said shell and said device each having a substantial resistance to deformation by pressure, and a pressure transmitting liquid in said shell, said tube and said device, said capillary tube being compressed to subject the transmitting liquid to a normal initial pressure.

2. In apparatus of the character described, a pressure responsive device, mechanism actuated thereby, a slightly yieldable shell, a tube connecting the interior of said shell to the interior of said pressure responsive device, the pressure transmitting liquid in said shell, said tube and said device constituting therewith a closed pressure transmitting system and adjustable means on the outside of said capillary tube for deforming the same.

3. In apparatus of the character described, a bulb comprising a closed shell member, a hollow core of compensating material within the shell member defining therewith an interspace, a capillary connection through the shell member to the interspace, and a pressure transmitting fluid in said interspace and said capillary connection.

4. In apparatus of the character described, a bulb comprising a closed shell member, a hollow core of compensating material within the shell member and defining therewith an interspace, said core being formed of material having a substantially lower coefficient of expansion than that of the shell member, a capillary connection through the shell member to the interspace, and a pressure transmitting liquid in said interspace and said capillary connection.

KENNETH L. TATE.